April 3, 1928.

E. PIRON 1,664,483

APPARATUS FOR ABSORBING FLUIDS FROM GASES

Filed Sept. 30, 1921

INVENTOR.
Emile Piron
BY
Gifford & Bull
ATTORNEYS

April 3, 1928.

E. PIRON 1,664,483

APPARATUS FOR ABSORBING FLUIDS FROM GASES

Filed Sept. 30, 1921  2 Sheets-Sheet 2

INVENTOR.
EMILE PIRON
BY
ATTORNEYS

Patented Apr. 3, 1928.

1,664,483

UNITED STATES PATENT OFFICE.

EMIL PIRON, OF NEW YORK, N. Y., ASSIGNOR TO PIRON COAL DISTILLATION SYSTEMS, INC., OF NEW YORK, N. Y., A CORPORATION OF DELAWARE.

APPARATUS FOR ABSORBING FLUIDS FROM GASES.

Application filed September 30, 1921. Serial No. 504,505.

My present invention relates to apparatus by which fluids carried by gases may be absorbed in a menstruum, such as the absorption of gasoline from natural gas.

In such absorption process, the menstruum may be any suitable fluid, such as any suitable hydrocarbon, fatty oils or the like. In order to insure that the fluid carried by the gas shall be thoroughly contacted with the absorbing menstruum, I provide a foraminous support for a thin sheet of the menstruum and pass the gas through the holes in this support. This causes bubbles to be formed in the menstruum, which bubbles will burst as they reach the surface of the menstruum, thus spraying the menstruum into intimate contact with the gas and consequently with the fluid, such as gasoline, carried by the gas.

The formation of these bubbles is provided for very simply in my present invention. By making the holes in the foraminous support for the sheet of menstruum small enough, so that, because of the viscosity of the menstruum and the supporting pressure of the gases, the menstruum will not flow through the openings, but, on the other hand, will be held over the openings so that the gas may be forced into the menstruum, I have provided an apparatus which is not only cheap to manufacture and to operate, but one which insures the desired intimate contact.

Figure 1:
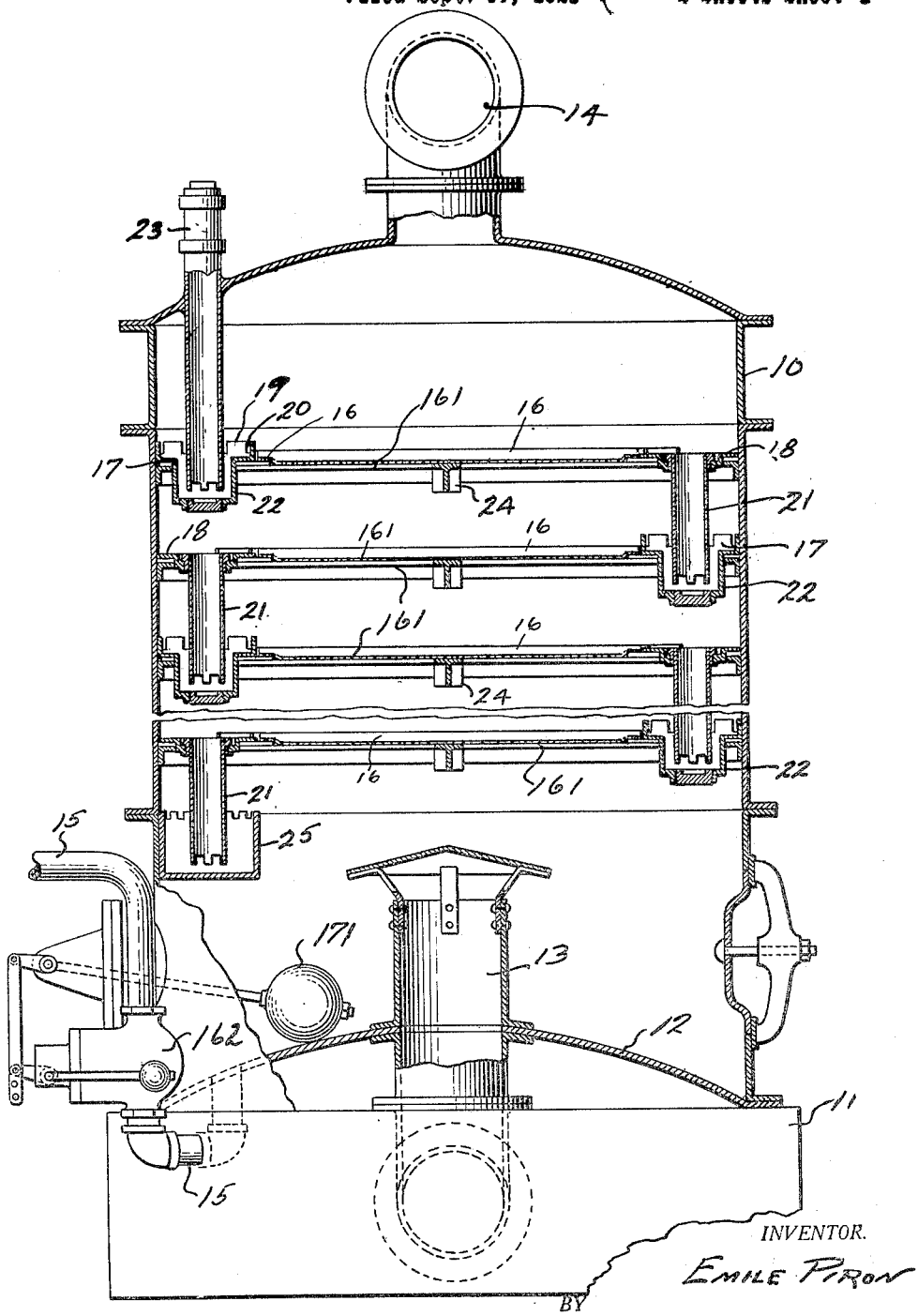
Figure 2:
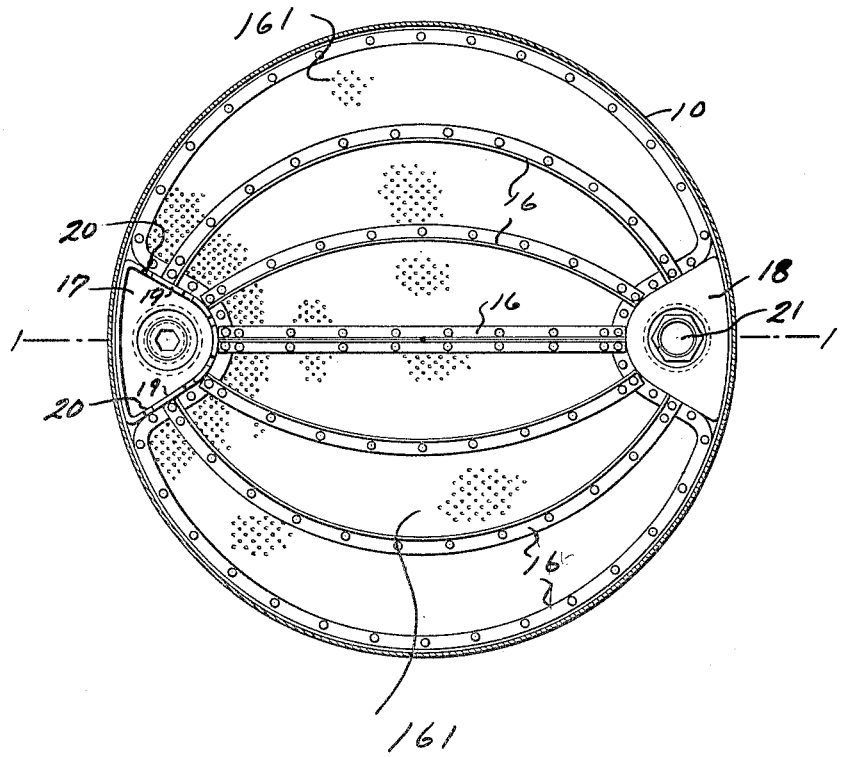

In the drawings, I have shown one form of apparatus which may be used to illustrate my invention and to carry out my process, Figure 1 being a side elevation, partly in section, of such an apparatus, and Fig. 2 a plan view of one of the foraminous supports shown in Fig. 1.

Like reference characters indicate like parts in the several views.

In the illustrative form of apparatus shown in the drawings, a tank or receiver 10 is mounted on a base 11, the tank having a bottom 12 through which extends an inlet pipe 13 through which the gas carrying the fluid to be separated enters the apparatus. At the top of the apparatus is a gas exit 14 and, as shown at the left of Fig. 1, the apparatus is provided with a pipe 15 through which the menstruum with its absorbed fluid may pass out of the apparatus, this pipe 15 being controlled by a valve 162 operated by a float 171, so that the pipe 15 will be closed until the menstruum covers the inlet to the pipe 15, whereby that pipe is always sealed against the exit of gas therethrough.

Above the gas inlet 13, I place as many menstruum supports as may be required, the apparatus shown in Fig. 1 being broken to indicate that a number of these plates, such as would ordinarily be used, have been omitted. These plates are all alike and the description of one of them will apply to all. Each plate comprises a sheet metal piece 161 provided with holes relatively small in diameter and closely spaced, this sheet metal being preferably quite thin, and in order to give it rigidity and so to insure that the menstruum is distributed uniformly over the plate, each plate 161 is provided with a number of angle-irons 16, the outer one of which abuts against the inner wall of the tank 10 and the others, except at the center, being bent on arcs of circles extending from the inlet pan 17 to the outlet pan 18.

The inlet pan 17 is formed, as shown best in Fig. 2, with a wall 19 provided with slots or openings 20, each slot being within the zone formed by two of the angle-irons 16.

The outlet pan 18 has no projecting walls, but has an outlet pipe 21 which is shown in Fig. 2, and preferably extends downward below the level of the menstruum on the next plate, the inlet pan 17 being provided with a depression 22 in which the outlet pipe of the next upper plate will project. The entrance to pipe 21 is higher than the top surface of plate 161. A pipe 23 is provided through which the menstruum may be passed to the first or uppermost of the menstruum supporting plates. If desired, a T-iron 24 may be provided under each of the foraminous plates, so that such plates will be stiffened in a direction at right-angles to that of the angle-irons 16.

The menstruum flows through the pipe 23 into the reservoir 22 of the first inlet pan and rises to the level of the notches 20. From here, it flows across the plate 161, being guided by the angle-irons 16, so as to be compelled to spread over the entire surface of the plate 161, finally passing into the outlet pipe 21, and from thence into the reservoir 22 of the next lower plate. In this way, the menstruum passes back and forth across successive plates until it comes to the last reservoir 25, over which it flows into the bottom of the tank 10, from which it may be removed through the pipe 15 when the valve 162 is opened by the rising of the float 171.

As the menstruum is flowing across the plates, gas under pressure passes into the tank 10 from the inlet 13. Since all of the openings in the menstruum supporting plates are sealed, the gas forces its way through the openings in the plate 161 and, because of the viscosity of the absorbing fluid, bubbles are formed which, as the gas continues to expand, are caused to burst at the surface of the menstruum on the plate 161, the gas in the bubble passing on to the next plate and through that in turn in the same manner.

While I have shown a specific embodiment of the apparatus by which, preferably, I carry out my method, I do not desire to restrict myself to this specific construction, and it will also be understood that the apparatus illustrated may be varied within wide limits.

I claim:—

1. An absorption device comprising a horizontal foraminous member, a menstruum inlet at one side of said member and a menstruum outlet at the other side thereof, and guides between said inlet and said outlet arranged to divide the menstruum into a plurality of defined streams flowing across said member.

2. An absorption device comprising a horizontal foraminous member, a menstruum inlet at one side of said member and a menstruum outlet at the other side thereof, and curved guides between said inlet and said outlet arranged to divide the menstruum into a plurality of defined streams flowing across said member.

3. An absorption device comprising a horizontal foraminous member, a menstruum inlet at one side of said member and a menstruum outlet at the other side thereof, said inlet comprising a cup having its wall projecting above the face of said member with openings in said wall, and guides extending from said inlet to said outlet and dividing the face of said member into a plurality of channels, each connected with one of said openings.

4. An absorption device comprising a horizontal foraminous member, a menstruum inlet at one side of said member and a menstruum outlet at the other side thereof, said inlet comprising a cup having its wall projecting above the face of said member with openings in said wall, and curved guides extending from said inlet to said outlet and dividing the face of said member into a plurality of channels, each connected with one of said openings.

EMIL PIRON.